(12) United States Patent
Huitema et al.

(10) Patent No.: US 8,508,920 B2
(45) Date of Patent: Aug. 13, 2013

(54) ELECTRONIC APPARATUS WITH IMPROVED FUNCTIONALITY

(75) Inventors: Hjalmar Edzer Ayco Huitema, Veldhoven (NL); Rik Kruidhof, Enschede (NL); Johannes Cornelis Adriaan Hamers, Breugel (NL)

(73) Assignee: Creator Technology B.V., Breda (NL)

( * ) Notice: Subject to any disclaimer, the term of this patent is extended or adjusted under 35 U.S.C. 154(b) by 79 days.

(21) Appl. No.: 12/744,254

(22) PCT Filed: Nov. 24, 2008

(86) PCT No.: PCT/NL2008/050743
§ 371 (c)(1),
(2), (4) Date: Oct. 11, 2010

(87) PCT Pub. No.: WO2009/067013
PCT Pub. Date: May 28, 2009

(65) Prior Publication Data
US 2011/0018820 A1    Jan. 27, 2011

Related U.S. Application Data

(60) Provisional application No. 60/989,896, filed on Nov. 23, 2007.

(51) Int. Cl.
*H05K 5/00*      (2006.01)
*H05K 7/00*      (2006.01)
*A47B 81/00*   (2006.01)

(52) U.S. Cl.
USPC ............ 361/679.01; 361/679.05; 361/679.27; 361/679.57; 312/223.3

(58) Field of Classification Search
USPC ............. 361/679.01, 679.02, 679.08, 679.09, 361/679.3, 679.55–679.59; 349/58; 312/223.1, 312/223.2, 223.3
See application file for complete search history.

(56) References Cited

U.S. PATENT DOCUMENTS

| | | |
|---|---|---|
| 6,016,176 A | 1/2000 | Kim et al. |
| 2002/0060467 A1* | 5/2002 | McManus et al. ......... 296/26.01 |
| 2002/0090980 A1 | 7/2002 | Wilcox et al. |
| 2002/0118151 A1 | 8/2002 | Chen |
| 2006/0077118 A1* | 4/2006 | Huang et al. ................... 345/1.3 |

(Continued)

FOREIGN PATENT DOCUMENTS

| | | |
|---|---|---|
| JP | 2006-287982 | 10/2006 |
| WO | WO 02/33685 | 4/2002 |

(Continued)

OTHER PUBLICATIONS

International Search Report for PCT/NL2008/050743 dated Feb. 26, 2009.

(Continued)

*Primary Examiner* — Zachary M Pape
*Assistant Examiner* — Jerry Wu

(57) ABSTRACT

The invention relates to an electronic apparatus comprising a flexible display 12 cooperating with a housing 15 and conceived to be alternated between an at least partially collapsed state and an at least partially extended state, said housing 15 comprising a substantially rigid portion 16a, 16b, 16c conceived to at least partially support an outer region of a surface of the flexible display in the extended state, wherein said rigid portion 16a, 16b, 16c is arranged for at least partially receiving a functional module 18a, 18b, 18c of the electronic apparatus.

8 Claims, 11 Drawing Sheets

(56) References Cited

U.S. PATENT DOCUMENTS

Figure 1B:
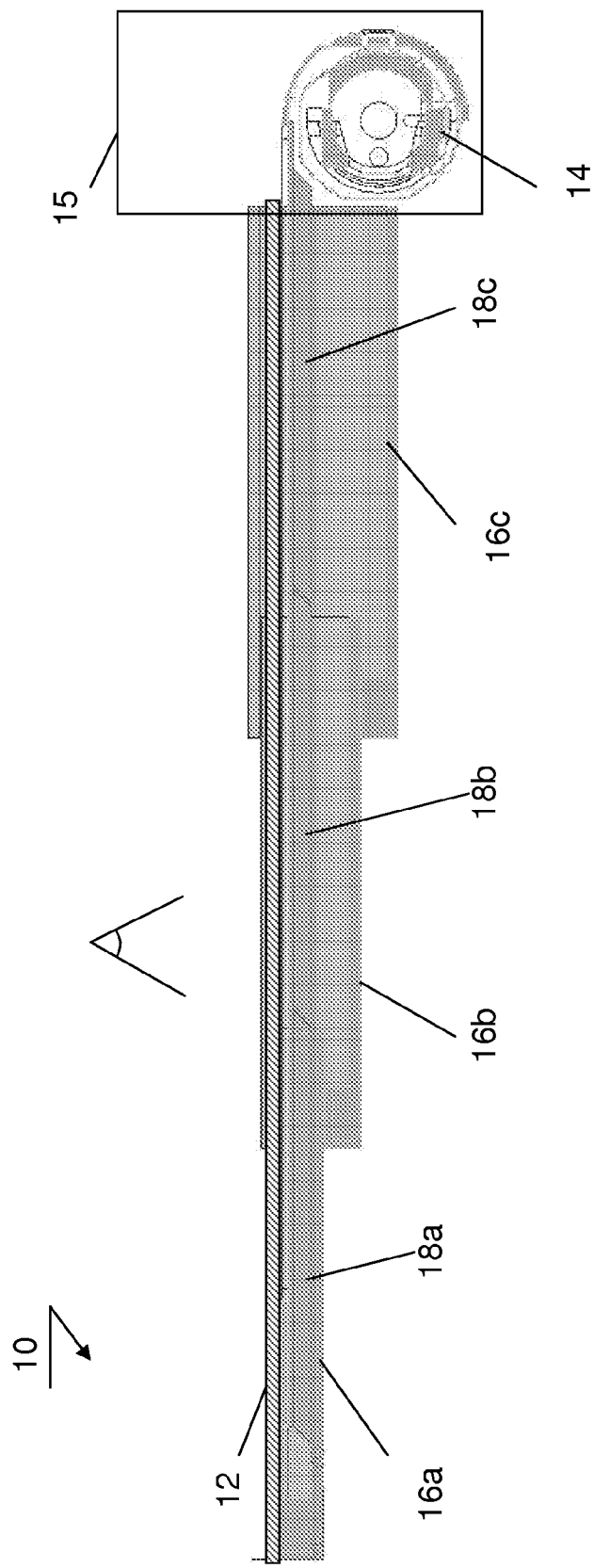

| | | | |
|---|---|---|---|
| 2006/0194619 A1* | 8/2006 | Wilcox et al. | 455/566 |
| 2006/0232578 A1* | 10/2006 | Reinhorn | 345/211 |
| 2006/0245862 A1* | 11/2006 | Hansl et al. | 414/281 |
| 2010/0164973 A1* | 7/2010 | Huitema et al. | 345/581 |
| 2010/0246113 A1 | 9/2010 | Visser et al. | |

FOREIGN PATENT DOCUMENTS

| | | |
|---|---|---|
| WO | WO 03/019349 A | 3/2003 |
| WO | WO 2004/114259 A | 12/2004 |
| WO | WO 2006/085271 A2 | 8/2006 |
| WO | WO 2007/012899 A1 | 2/2007 |

OTHER PUBLICATIONS

International Seach Report for PCT/NL2008/050248 dated Nov. 4, 2008.

Japan Patent Office, Office Action, Patent Application Serial No. 2010-506101, Oct. 30, 2012, Japan.

* cited by examiner

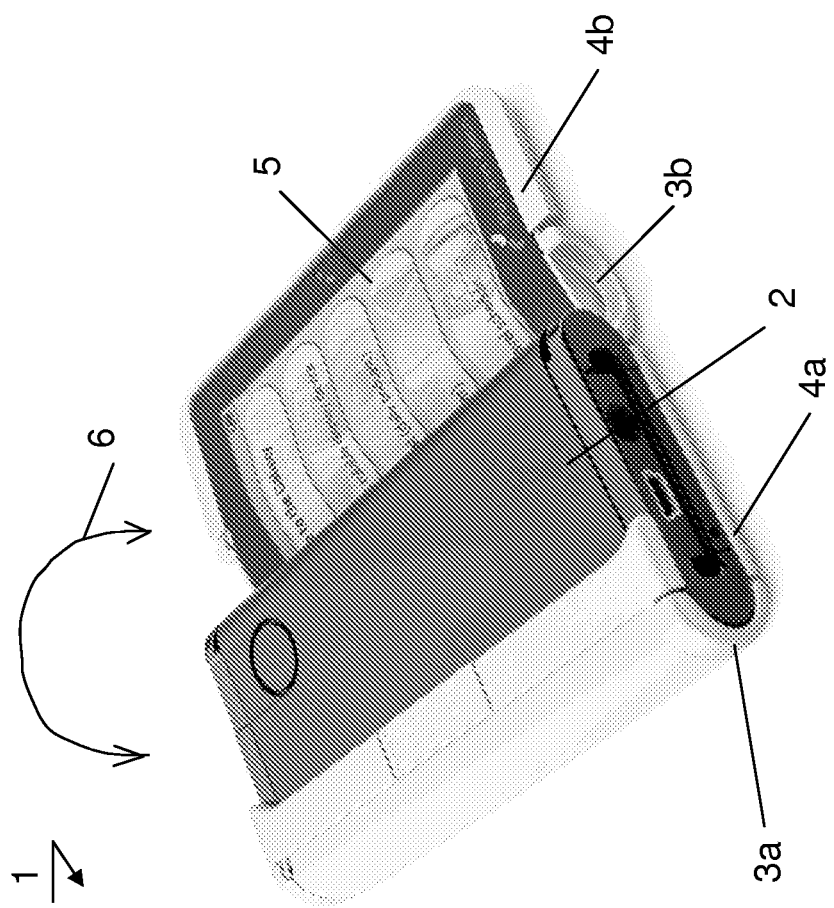

ELECTRONIC APPARATUS WITH IMPROVED FUNCTIONALITY

FIELD OF THE INVENTION

The invention relates to an electronic apparatus comprising a flexible display. In particular, the invention relates to an electronic apparatus having a touch sensitive flexible display and/or flexible display provided with a back- or front-lighting functionality.

BACKGROUND OF THE INVENTION

An embodiment of an apparatus comprising a flexible display is known in the art. For example, mobile phones or organizers having collapsible flexible displays are known. In particular, WO 2004/114259 describes an electronic device comprising an extendable, rollable display, provided with an extendable side member. The known extendible side member is arranged for providing support and structural rigidity to the display screen. The known side member is also arranged to provide a solid edge of the known display device, notably for protecting potentially delicate edge of the display screen material. The known flexible display is wound around a suitable roller in the housing upon storage, whereas the side member is shoved into internal storage channels provided inside the housing next to the roller and substantially parallel to it. It will be appreciated that in the construction of the known display device while the flexible display is translated substantially in parallel to its plane, the side members undergo a 90 degree bend when being alternated between a storage position and the extended position.

It is desirable to provide electronic devices with flexible displays having touch-screen and back-lighting/front-lighting functionalities. It is noted that in conventional, glass-based, displays touch is realized by putting a touch sensitive transparent screen in front of the display. Several types of touch screen technology exist. The screen can be resistive, where a touch on the screen causes a local change in the electrical current, which is used for determining the position. Another type uses ultrasonic waves that pass over the touch screen panel. Yet another type is a capacitive touch screen, where an electric field is applied through a front panel. The disturbance of this field through proximity or direct touch of the front panel by an operator is detected.

In conventional, glass-based, displays backlighting is realized by putting a light source behind the display. The light source can be an incandescent light bulb, one or more light-emitting diodes (LED's), an electroluminescent panel (ELP), one or more cold cathode fluorescent lamp (CCFL) or hot cathode fluorescent lamps (HCFL). Most of these are used with a diffuser between the display and the light source for an even illumination. Front lighting can be enabled with any light source and does not necessarily need a diffuser.

It is a disadvantage of the known state of the art that the standard touch functionality and/or back-lighting/front-lighting functionality cannot be easily arranged on a flexible display due to degradation of display flexibility imposed by standard solutions.

However, it is desirable to provide an electronic apparatus with a flexible display, wherein touch functionality and/or back-lighting/front-lighting functionality are enabled. An embodiment of an electronic apparatus comprising a touch-sensitive flexible display is known from KR 20060113595. The known flexible display is arranged with a plurality of pressure-sensitive elements positioned beneath the flexible display. In order to input suitable data a person has to push a touch-sensitive area of the display with his finger. It is a disadvantage of the known electronic apparatus that its flexible display may be damaged due to exhibiting external pressure to the display area on one hand, and that it is not suitable for collapsible display concept due to the presence of relatively voluminous and rigid pressure sensitive elements.

SUMMARY OF THE INVENTION

It is an object of the invention to provide an electronic apparatus comprising a flexible, collapsible display with improved functionality, notably with improved touch and display illumination functionality.

To this end the electronic apparatus according to the invention comprises a flexible display cooperating with a housing and conceived to be alternated between an at least partially collapsed state and an at least partially extended state, said housing comprising a substantially rigid portion conceived to at least partially support an outer region of a surface of the flexible display in the extended state, wherein said rigid portion is arranged for at least partially receiving a functional module of the electronic apparatus.

The technical measure of the invention is based on the insight that rigid portions provided for protection of the edges of the flexible display can be used for accommodating suitable devices, materials or elements necessary for enabling desirable electronic functionality of the apparatus, like touch or illumination functionality. In this way such functional modules, or complete devices, materials or elements may be positioned in an area outside the area of the flexible display thereby not affecting deformation properties of the display. Therefore, such flexible displays may still effectively be alternated between a collapsible state and an extendable state. Additionally or alternatively, such rigid portions may be provided for protection of a back surface of the flexible display thereby improving its durability.

It is noted that a great plurality of display configurations are possible. For example, the flexible display may be arranged as a rollable piece, a rear end thereof being affixed to a suitable roller, which may be positioned inside a housing of the electronic apparatus. In this way the display will be rolled-out on use, for example in response to a suitable pulling of a head end of the display. Alternatively, it is possible that both the rear end and the head end are affixed to respective rollers positioned in the housing of the electronic apparatus, the display being extended upon a relative movement of the head end and the tail end away from each other.

In a further embodiment it is possible that the flexible display is arranged to at least partially wrap about the housing of the electronic apparatus. Preferably, in this case the front side of the display is oriented inwards so that it is not damaged when the display is not in use. The flexible display may be arranged to make a complete revolution about the housing, although more revolutions for elongated displays are possible. An example of this embodiment is the wrap-concept, shown in FIG. 1.

In an embodiment of the electronic apparatus according to the invention the housing comprises a plurality of rigid portions being arranged as U-shaped telescopic parts.

This particular embodiment has an advantage that the U-shaped telescopic parts provide areas inside the U-shaped segments for receiving suitable functional modules, devices, materials or elements necessary for enabling sought functionality of the electronic apparatus, like touch or illumination functionality.

Preferably, the rigid portions are arranged for receiving an edge portion of the flexible display and a touch sensor cooperating with the edge portion of the flexible display. The touch sensor may also be arranged substantially over the whole active area of the flexible display and be positioned beneath it. In this case the touch sensor may be arranged in segments which dimension substantially corresponds to a dimension of the segments of the telescopic parts. Preferably, the U-shaped segments are formed as telescopic drawers. In order to provide a touch-sensitive plane formed from segments of the touch sensor the telescopic rigid parts may comprise means for displacing the respective segments of the touch sensor during a transition between the collapsed state and the extended state of the flexible display. It is noted that also L-shaped portions or portions having curved regions, or the like are possible. This embodiment is discussed in more details with reference to FIGS. 1b and 1c.

In a further embodiment of the electronic device according to the invention the touch sensor comprises a plurality of sensor elements distributed along the rigid portions.

In accordance with the present embodiment the touch sensor may comprise several pressure sensitive sensors that may be arranged to flip or to be pushed up and down with the opening and closing of the U-shaped telescopic parts, which are preferably implemented as telescopic drawers. The sensors may be implemented as capacitive or pressure sensors, for example, whereas interpolating between the sensors gives the exact position on or above the display screen. This embodiment is discussed in more details with reference to FIGS. 2a and 2b.

In a further embodiment of the electronic apparatus according to the invention the touch sensors are arranged above the flexible display.

Preferably in this embodiment for the touch sensors substantially rigid, opaque touch sensors are used. Such sensors may be mounted in the U-shaped drawers. Upon the extension of the drawers, the drawers align to one another leading to a corresponding alignment of the touch sensors. In this way a substantially flush surface may be created enabling a touch-sensitive interface. This embodiment is discussed in more details with reference to FIG. 3.

Preferably, the touch sensors are selected from the group comprising capacitive sensors, pressure sensors, electromagnetic sensors, acoustic sensors, piezoelectric sensors or resistive sensors. An example of a pressure sensor may be a piezoelectric sensor among other suitable examples. An example of an electromagnetic sensor may be an infra-red sensor among other suitable examples. In particular infra-red or acoustic sensors are advantageous because they operate without the necessity of touching the display. For example, such sensors may be accommodated in the U-shaped rigid parts, which may preferably be arranged as telescopic parts formed as drawers. Such drawers protect the edge and/or back portions of the flexible display and may be in contact with the front or the back surface of the display. When the sensors are positioned behind the display, a depression made by compressing the display can be detected. This embodiment is discussed in more details with reference to FIG. 4.

In a further embodiment of the electronic device according to the invention the touch sensor comprises a set of horizontal and vertical aligned grid wires below the flexible display where these wires preferably alternate between a transmit and a receive mode conceived to be cooperating with a suitable inductor resonant circuit, for example in the tip of a special pen or stylus. In this way by receiving a transmitted signal influenced by the coil and the inductor resonant circuit a position of the pen or stylus with regard to the flexible display can be determined.

For example, a metal grid may be mounted behind the flexible display and may be segmented by the telescopic parts. This grid is arranged to cooperate with the magnetizable body, for example a stylus, to supply power to it through electromagnetic interaction. In this way also a position of the stylus with respect to the flexible display may be determined. This embodiment uses a known principle, disclosed, for example in WO 2006/039939. Preferably, the tip of the sylus is made pressure sensitive for detecting tapping on the display. This embodiment is discussed in more details with reference to FIG. 5.

In a further embodiment of the electronic apparatus according to the invention the functional module comprises illumination means.

The flexible display may be implemented as a transparent display for enabling a back-lighting functionality, which may be obtained by a light source arranged in the rigid portion and cooperating with light guides arranged substantially over the whole active area of the flexible display, below the flexible display. Preferably, the rigid portions are U-shaped for accommodating the light source or light sources. In this way the direct light from the light sources is shielded and light guides spread the light substantially evenly over the backplane of the display. The light sources and light guides can also be oriented in a non-parallel way with respect to the U-shaped telescopic parts. It is noted that such illumination functionality may be combined with a touch-sensitive functionalities as described in the foregoing. This embodiment is discussed in more details with reference to FIG. 6.

In a further embodiment of the electronic apparatus the display is arranged as a reflective element. The lighting functionality is enabled by a plurality of light sources arranged in the rigid portion above the flexible display. In this way a front-lighting functionality is enabled. Preferably, the light sources are received by the U-shaped telescopic parts. The light sources may be arranged at both lateral sides of the flexible display so that the light shines from both sides over the display. In order to obtain a net even front illumination of the display, the light sources may be wedge-shaped or, alternatively, a suitable lens may be provided in the light guides. Still alternatively, a filter may be used on the display screen. It is noted that such illumination functionality may be combined with a touch-sensitive functionalities as described in the foregoing. This embodiment is discussed in more details with reference to FIG. 7.

These and other details of the electronic apparatus according to the invention will be further discussed with reference to drawings, wherein like reference numerals refer to like elements. It will be appreciated that the description of the drawings may be used for illustrative purposes only and may not be constructed to limit a scope of protection in any way.

BRIEF DESCRIPTION

FIG. 1a schematically presents an embodiment of a wrappable electronic flexible display.

FIG. 1b schematically presents a side view of an embodiment of the electronic apparatus according to the invention.

Figure 1C:
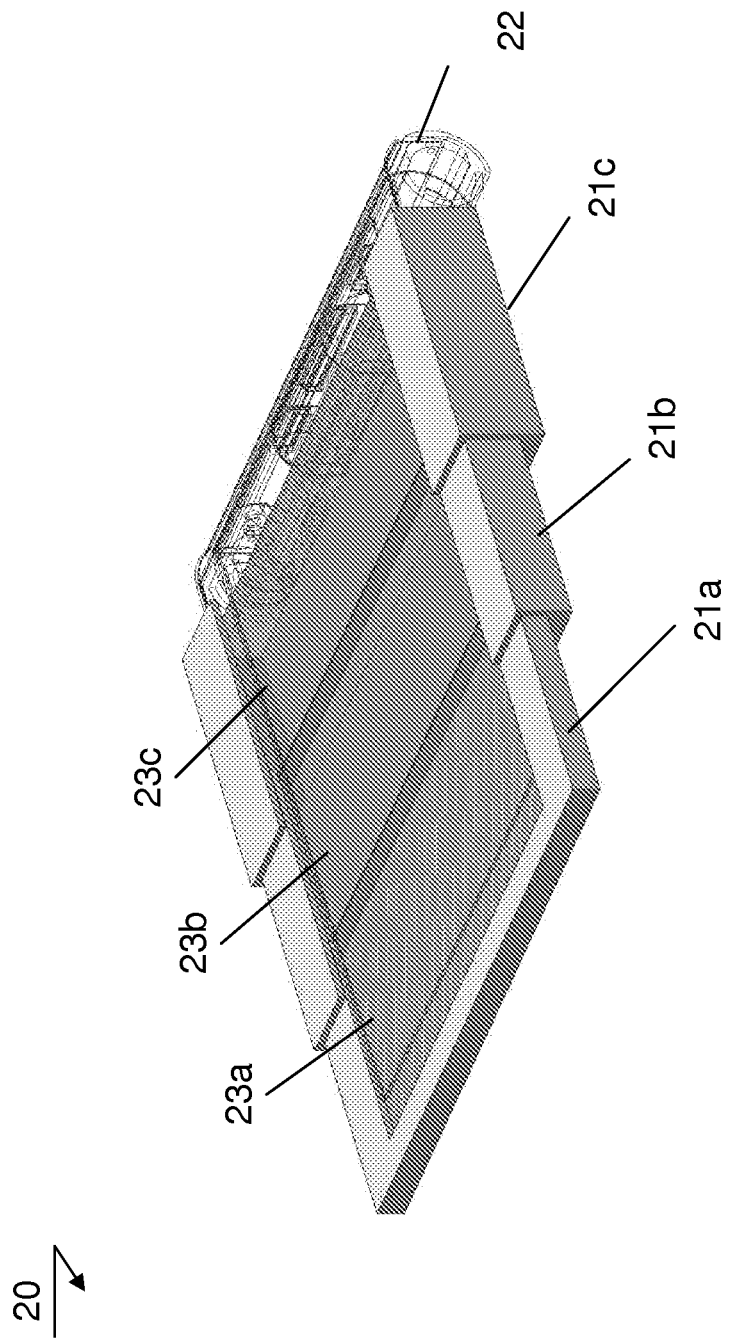

FIG. 1c schematically presents a three-dimensional impression of the embodiment shown in FIG. 1b.

Figure 2A:
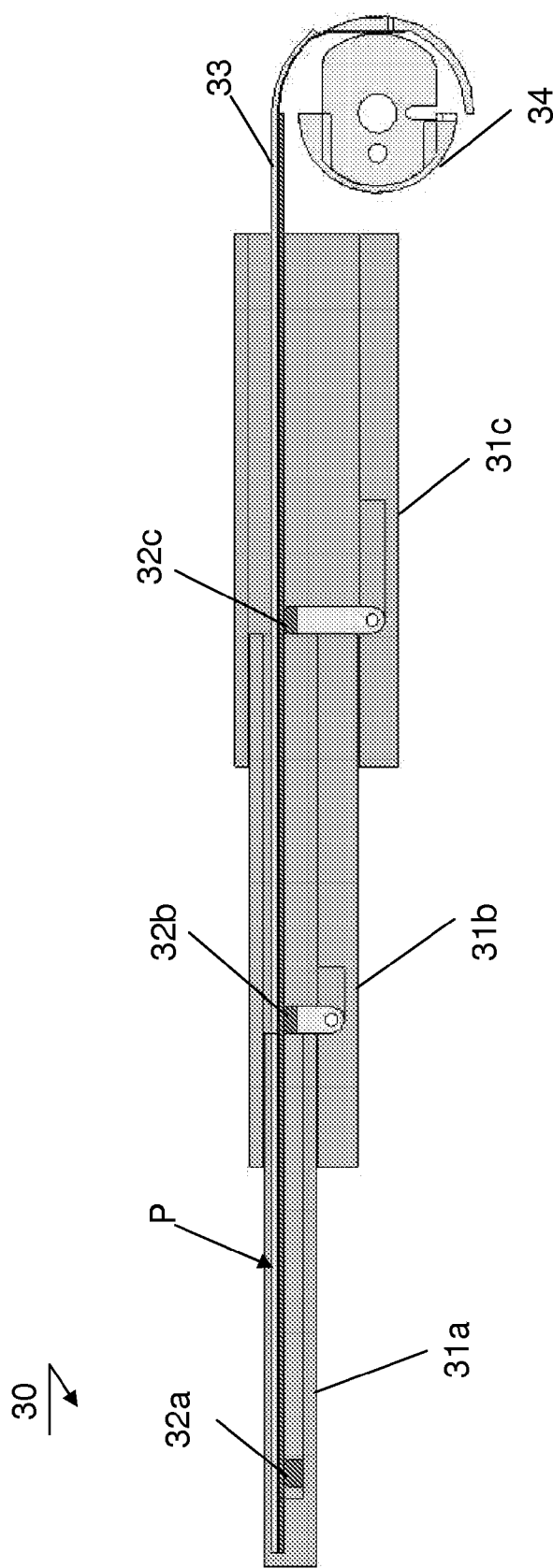

FIG. 2a presents a schematic side view of a further embodiment of the electronic device according to the invention.

Figure 2B:
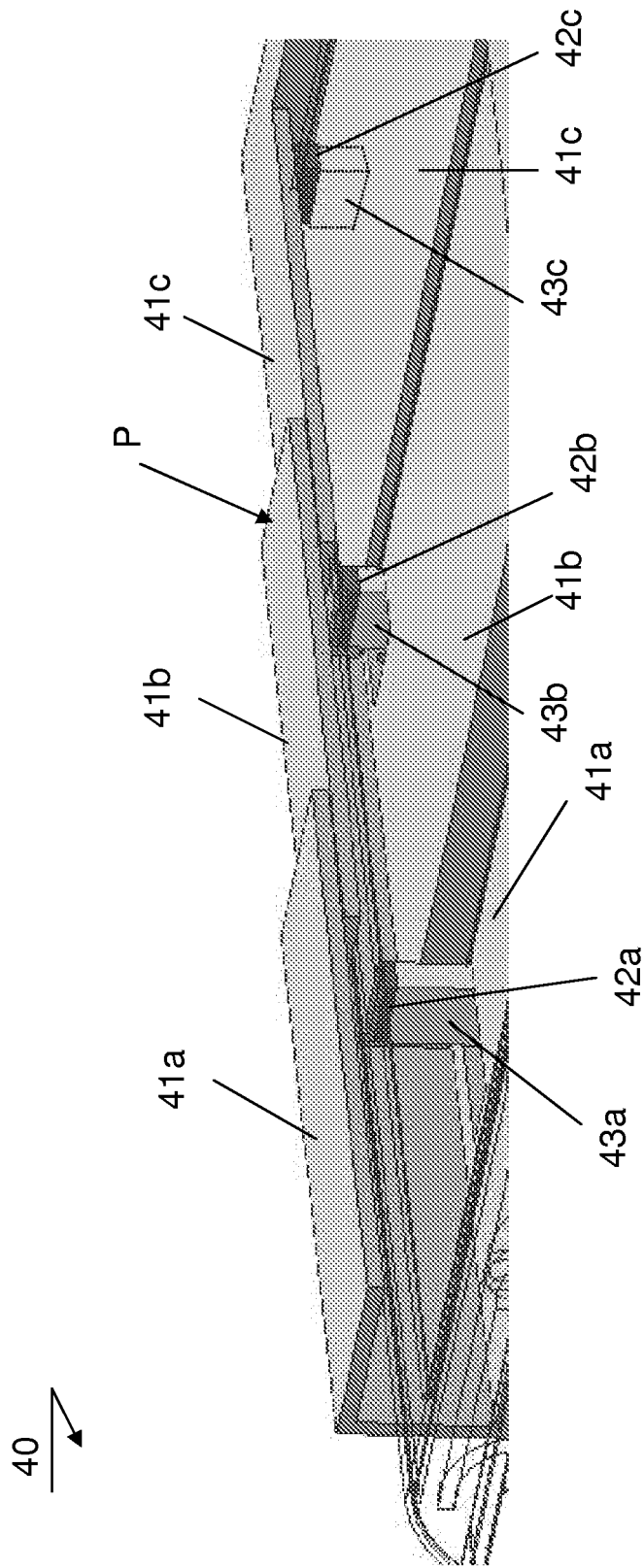

FIG. 2b schematically presents a three-dimensional impression of the embodiment shown in FIG. 2a.

Figure 3:
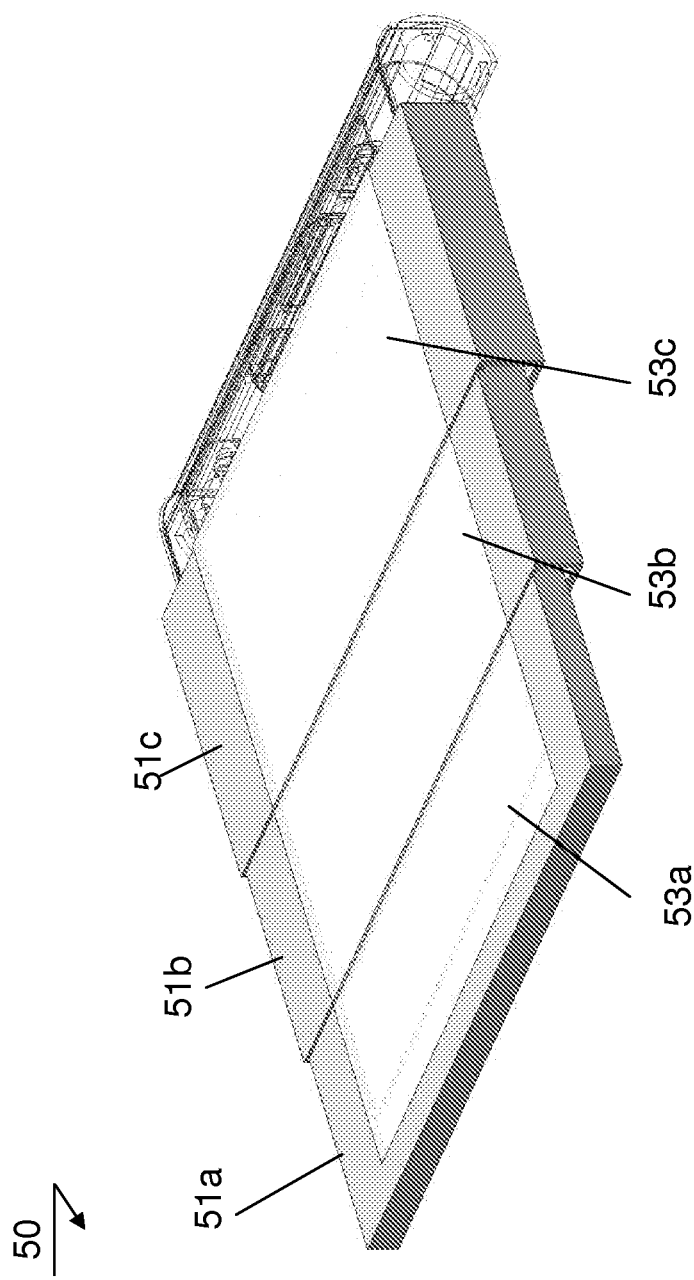

FIG. 3 presents a schematic view of an embodiment of the electronic apparatus according to the invention wherein a flush surface is provided.

Figure 4:
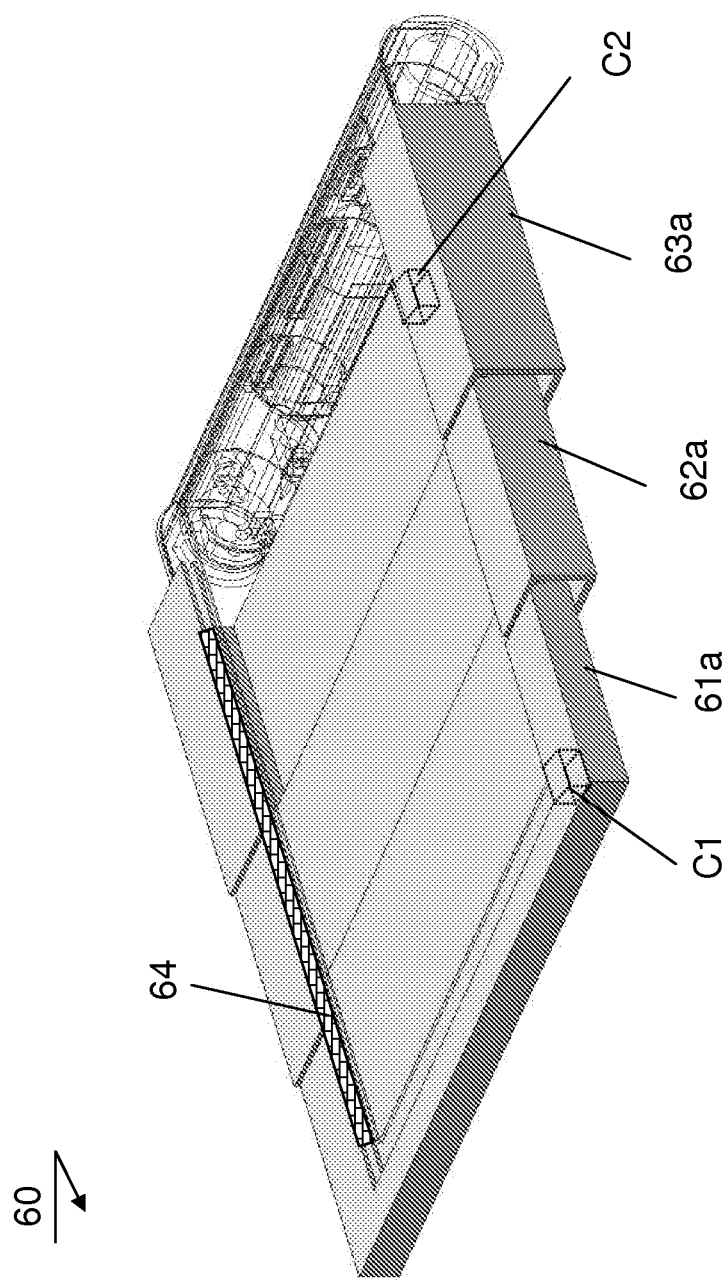

FIG. 4 presents a schematic view of a further embodiment of the electronic apparatus according to the invention.

Figure 5:
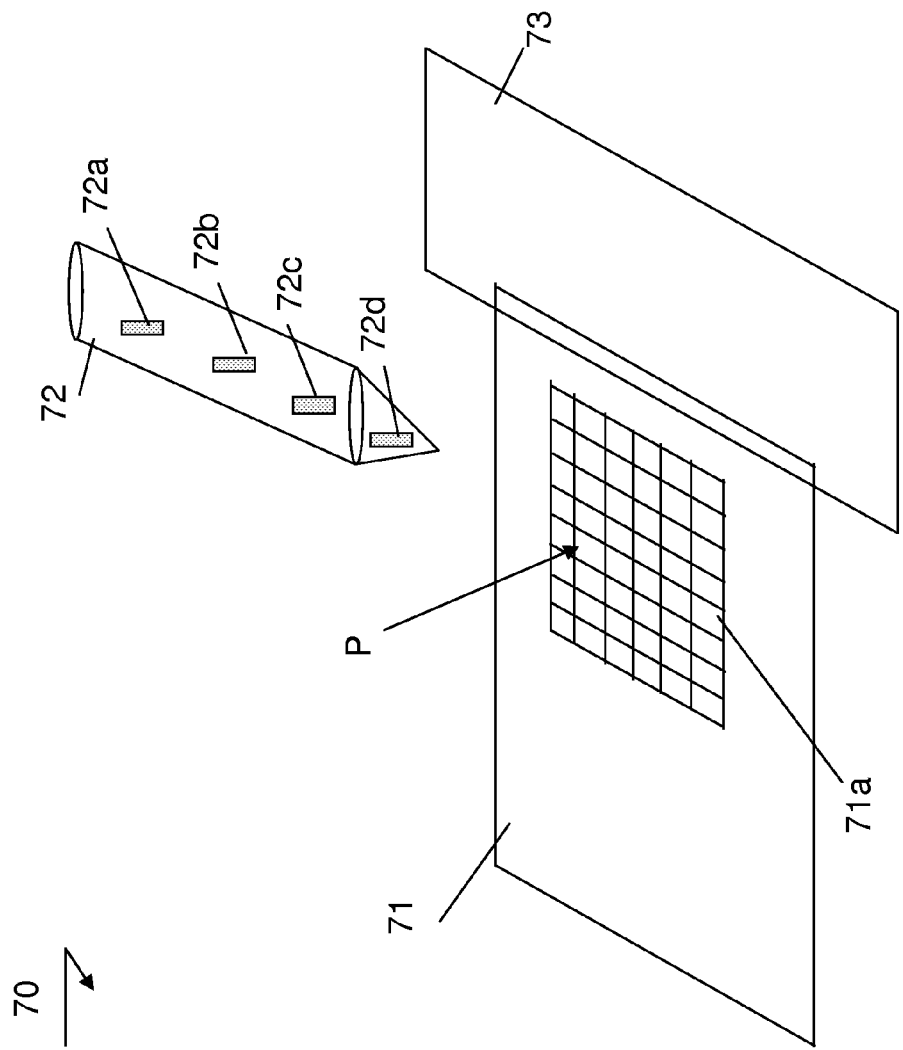

FIG. 5 presents a schematic view of a further embodiment of the electronic apparatus according to the invention.

Figure 6:
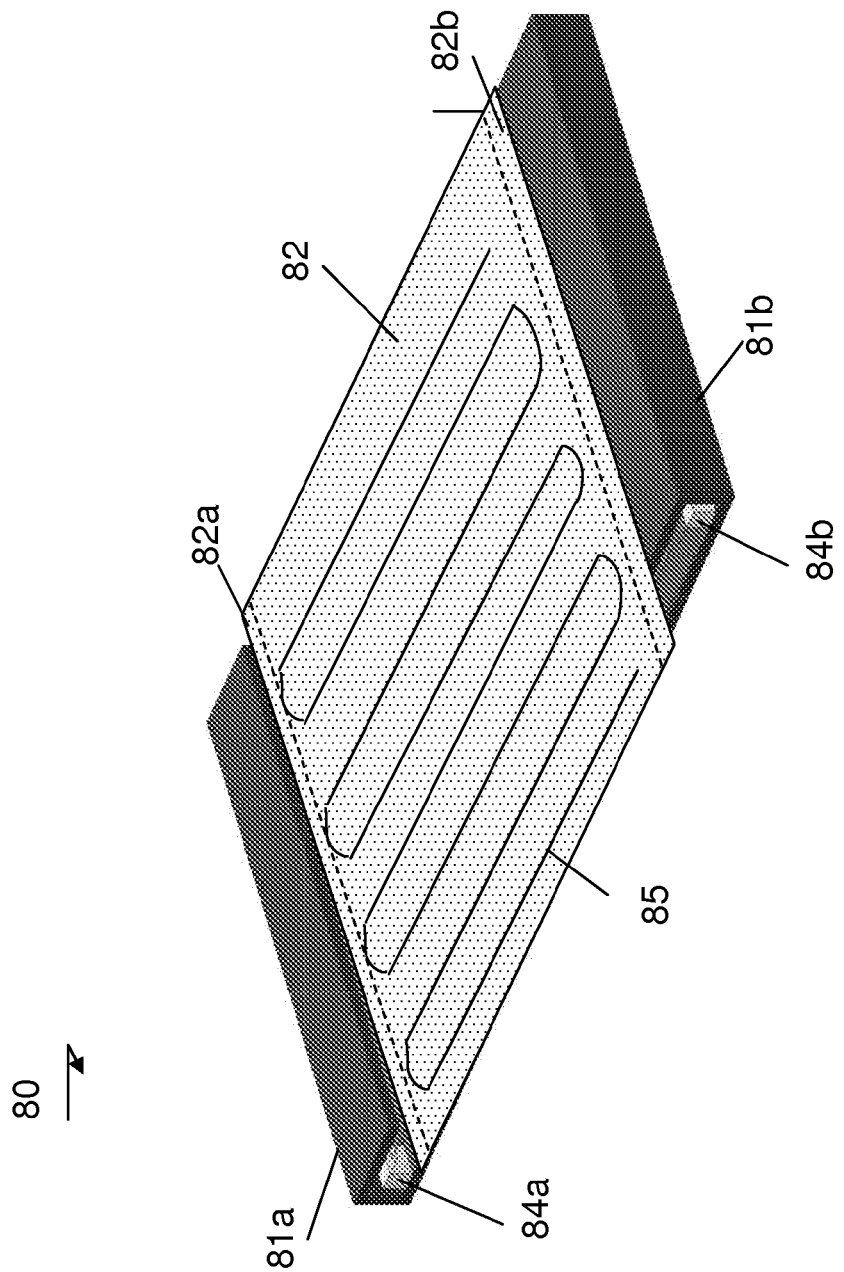

FIG. 6 presents a schematic view of an embodiment of the electronic apparatus according to the invention wherein a back-lighting is enabled.

Figure 7:
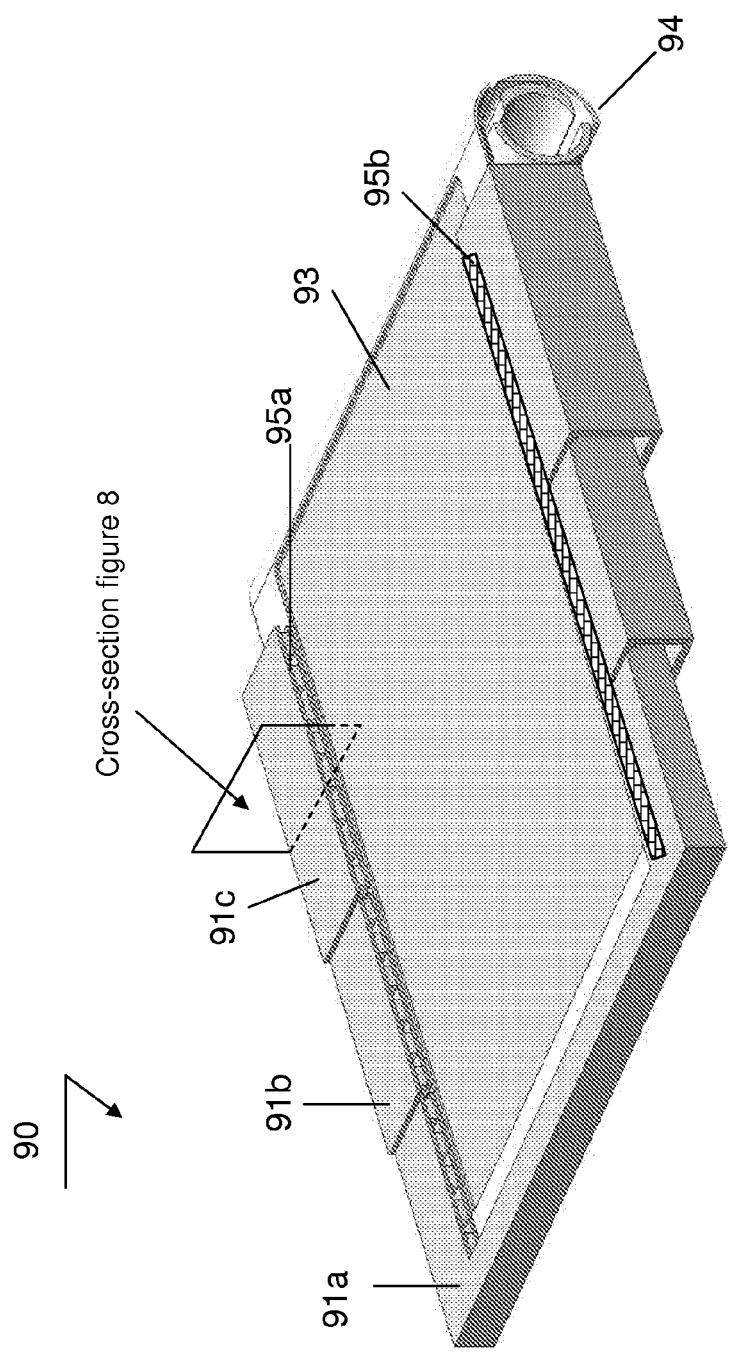

FIG. 7 presents a schematic view of an embodiment of the electronic apparatus according to the invention wherein a front-lighting is enabled.

Figure 8:
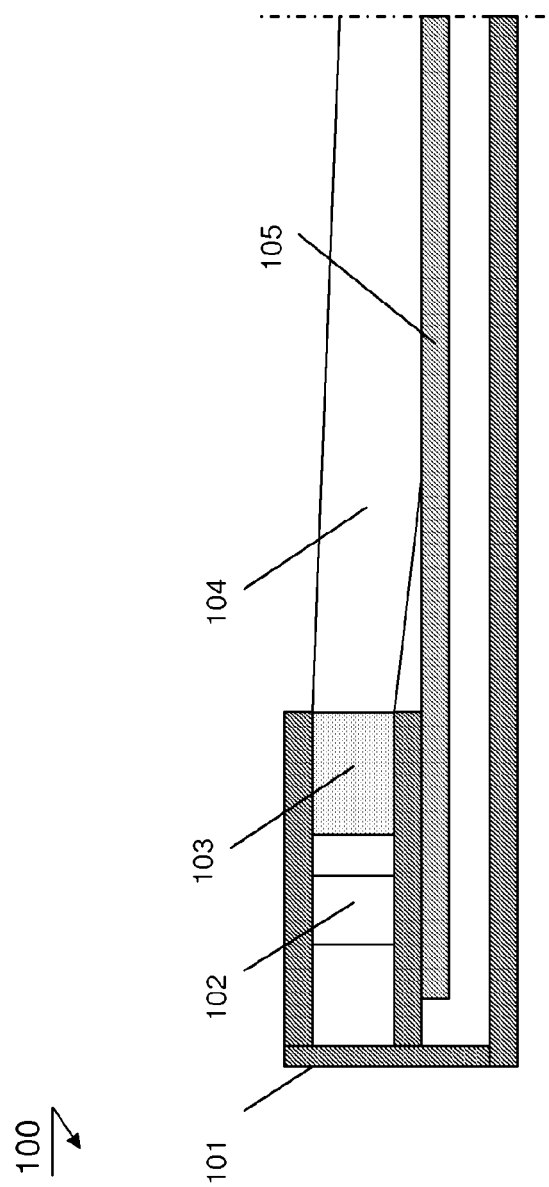

FIG. 8 presents a schematic view of a cross-section of an embodiment of the electronic device of FIG. 7.

DETAILED DESCRIPTION

FIG. 1a schematically presents an embodiment of a wrappable electronic flexible display. The flexible electronic display 5 may form part of a suitable electronic apparatus 1, like a mobile phone, an organizer, or the like. The wrappable electronic display 1 may be suitably supported by a portions 4a and 4b of a housing of the apparatus 1 so that the display 5 may be wrapped about another portion of the housing 2 of the apparatus 1. Preferably, the portion 2 and the portions 4a and 4b of the apparatus are displaceable with respect to each other along a direction schematically illustrated by arrow 6 by means of a suitable hinges 3a and 3b.

FIG. 1b schematically presents a side view of an embodiment of the electronic apparatus according to the invention. The electronic apparatus 10 may relate to a mobile phone, an organizer, a palmtop computer or the like. The electronic apparatus 10 comprises a housing 15 and a flexible display 12 cooperating with the housing 15. For example, the flexible display may be arranged as a rollable body, in which case the flexible display is conceived to be wound about a suitable roller 14 arranged in the housing 15 in its collapsed state. It is desirable that in an extended state the flexible display 12 is substantially flat and that it's edge regions are supported and protected. For this purpose the electronic apparatus 10 comprises rigid portions 16a, 16b, 16c cooperating with the housing 15 and preferably arranged as U-shaped telescopic parts. More preferably, the portions 16a, 16b, 16c are arranged as telescopic drawers so that the portions 16a, 16b are preferably completely received by the portion 16c in a collapsed state of the flexible display 12. In accordance with the invention the rigid portions 16a, 16b, 16c are arranged to at least partially receive a device 18a, 18b, 18c for enabling touch functionality of the electronic apparatus 10, in particular the display thereof. The device 18a, 18b, 18c may be a touch sensor divided in segments, each segment being supported by a respective telescopic portion 16a, 16b, 16c. The telescopic portions may further comprise a displacement means (not shown) for causing the segments 18a, 18b, 18c of the touch sensor to align to each other so that in an extended state the portions 18a, 18b, 18c form a substantially flush surface. The flush surface will be understood as substantially flat surface, whereby the segments 18a, 18b, 18c are aligned in a plane substantially parallel to a plane in which the flexible display 12 is extended. FIG. 3 presents a schematic view of an embodiment of the electronic apparatus according to the invention wherein a flush surface is provided. The rigid portions 51a, 51b, 51c are arranged to enable segments 53a, 53b, 53c to align together in an extended state of the flexible display (not shown) forming a substantially flat surface. Suitable touch sensors may be selected from a group comprising capacitive sensors, pressure sensors, electromagnetic sensors, acoustic sensors or resistive sensors. Principle of operation of such sensors is known in the art.

FIG. 1c schematically presents a three-dimensional impression of the embodiment shown in FIG. 1b. For purpose of clarity only the telescopic parts 21a, 21b, 21c and the roller 22 of the electronic apparatus of FIG. 1a are shown. FIG. 1b presents an impression of a mutual alignment of the touch sensor segments 23a, 23b, 23c for an extended state of the flexible display (not shown). The touch sensor segments 23a, 23b, 23c may be mounted beneath the flexible display and are partially received by the rigid portions 21a, 21b, 21c. In order to align the segments 23a, 23b, 23c of the touch sensor in the extended state of the flexible display, the electronic apparatus 20 may comprise displacement means (not shown) arranged to push the segments 23a, 23b, 23c upwards upon extending the flexible display. Suitable examples of the displacement means may comprise chamfered edges, cams, bars or springs. When the touch sensor segments 23a, 23b, 23c are contacted by a user, preferably using a pointer, the position of the contact area is determined using per se known methods. For example, the position of the contact area may be determined using a per se known interpolation technique or a resistive method.

FIG. 2a presents a schematic side view of a further embodiment of the electronic device according to the invention. In accordance with this embodiment of the electronic apparatus 30 according to the invention the flexible display 33 is arranged to be rolled about a roller 34 positioned in a suitable housing (not shown). In order to support the flexible display 33 in it's extended state a set of retractable rigid parts 31a, 31b, 31c may be used. The rigid parts are preferably manufactured as U-shaped telescopic parts, whereby each part may receive one or more touch sensor 32a, 32b, 32c. In contrast with the embodiment shown in FIGS. 1a, 1b, the touch sensor of the present embodiment is substantially confined to the rigid portion. The touch functionality of the electronic apparatus 30 is enabled when an area between the touch sensors is suppressed. A position of an interaction point P is calculated by interpolating between the touch sensors 32a, 32b. It will be appreciated that for interaction points positioned between other touch sensors the same interpolation method is applied. Also these sensors 32a, 32b, 32c may be flipped or pushed upwards and downwards during extending and collapsing of the flexible display 33. Preferably, for this embodiment piezoelectric or resistive touch sensors are used.

FIG. 2b schematically presents a three-dimensional impression of the embodiment shown in FIG. 2a. The electronic apparatus 40 thus comprises a set of telescopic parts 41a, 41b, 41c arranged to protect and to support edge portions of the flexible display (not shown) and to at least partially receive the touch sensors 42a, 42b, 42c. The rigid portions may further comprise back protection portions 41a, 41b, 41c for protecting a back surface of the flexible display. The displacement means 43a, 43b, 43c, which may comprise chamfered edges, cams, bars or springs are arranged to push the sensors 42a, 42b, 42c upwards and downwards upon extending and collapsing of the flexible display. A position of an interaction point P may be determined by interpolation between signals obtained from adjacent sensors 43b, 43c. Suitable interpolation techniques are known in the art.

FIG. 4 presents a schematic view of a further embodiment of the electronic apparatus according to the invention. The electronic apparatus 60 comprises rigid portions 61a, 62a, 63a arranged for supporting and protecting edge portions of the flexible display (not shown) conceived to be partially received by these rigid portions 61a, 62a, 63a. The electronic apparatus 60 further comprises a further embodiment of a touch sensor 64. Examples of suitable touch sensors comprise an electromagnetic sensor, for example an infra-red sensor, or an acoustic sensor, for example an ultrasonic sensor. Preferably the sensor 64 is substantially completely received by the respective rigid portions 61a, 62a, 63a. The sensor 64 may comprise a number of discrete sensors, or, alternatively a number of substantially continuous sensors divided into respective segments housed in the segments 61a, 62a, 63a. The rigid portions 61a, 62a, 63a are arranged to protect edge portions of the flexible display (not shown) and may be U-shaped to envelope the edge portions of the flexible display. The sensors 64 are preferably positioned behind the flexible display so that a compression caused by the display may be detected. For example infra-red light—emitting diodes (LED) may be used, or high-frequency sound sources positioned substantially inside the rigid portions 61a, 62a, 63a cooperating with camera's, respectively, microphones which may be positioned in the corners C1, C2. As an alternative embodiment two transversely arranged rows of sensors and emitters of either infra-red type or high-frequency sound type may be used.

FIG. 5 presents a schematic view of a further embodiment of the electronic apparatus according to the invention. The electronic apparatus 70 comprises a flexible display 71 cooperating with a housing 73 and a grid of a conductive material 71a, for example a metal, arranged beneath the flexible display 71. The flexible display 71 may comprise portions (not shown) segmented by the rigid parts as is schematically illustrated with respect to the foregoing figures. The grid 71a is arranged to comprise a suitable plurality of coil elements arranged to provide electrical power to a pointer 72 and to determine an interaction point of the pointer 72 when the pointer 72 is brought into contact with the display 71. Such operation of the display and the pointer may be base on the principle described in WO 2006/039939. The pointer 72 may be formed as a stylus. Preferably, the stylus 72 comprises a coil 72d for receiving electromagnetic power from the coils constituting the grid 71a. The pointer may further comprise a pressure sensor 72c for detecting an event of contacting the display 71. The pointer may be further arranged with a modulator 72b and a digital chip 72a for signal processing purposes.

FIG. 6 presents a schematic view of an embodiment of the electronic apparatus according to the invention wherein backlighting is enabled. The electronic apparatus 80 comprises a flexible display 82 end portions 82a, 82b of which are received by rigid portions 81a, 81b. The rigid portions 81a, 81b are preferably U-shaped for providing suitable support and protection for the edge portions 81a, 81b on one hand, and for receiving a device 84a, 84b on the other hand. In this embodiment the device 84a, 84b relates to light sources cooperating with light guide 85 arranged beneath the flexible display 82. It will be appreciated that use of a single light source is contemplated as well. It will be appreciated that enough space is provided beneath the display or diffuser and the light sources allowing the light sources to blend into an even spread. A determination of a suitable dimension of such space depending on at least an absolute dimension of the light sources and respective spacings between them falls within the scope of abilities of the person skilled in the art of optics. Preferably, the flexible display 82 is a transparent display. Preferably, the distance between the light sources and the display or diffuser is selected to be proportional to a distance between the light sources and light cones of the light sources. This has an advantage that a substantially even distribution of the backlight distributed by the light guides substantially evenly along a backplane of the flexible display 82. Another means to prevent these variations is by adding a diffusing layer to the backlight portions or even to the backside of the display or diffusing particles embedded in the bottom substrate of the display. It will be appreciated that the backlighting functionality may be combined with a touch functionality discussed with respect to the foregoing figures.

FIG. 7 presents a schematic view of an embodiment of the electronic apparatus according to the invention wherein a front-lighting is enabled. The electronic apparatus 90 comprises a reflective flexible display 93 arranged with front-lighting 95a, 95b positioned above a plane of the reflective display when it is in extended state. A suitable light source 95a, 95b, which preferably comprises an array of light sources distributed along the segments of rigid portions 91a, 91b, 91c may be arranged at both sides of the flexible display 93 being at least partially received by respective segments 91a, 91b, 91c of the rigid portions. In order to obtain a front-light intensity substantially uniform over the entire active area of the flexible display 95, a light guide conducting light to the light sources 95a, 95b may be wedge-shaped or may be provided with obstructive media, or with a filter or a suitable screen. It will be appreciated that the front-lighting functionality may be combined with a touch functionality discussed with respect to the foregoing FIGS. 1a-5.

FIG. 8 presents a schematic view of a cross-section of an embodiment of the electronic device of FIG. 7. The electronic apparatus 100 comprises a rigid portion shaped as a drawer 101 wherein a light-emitting diode 102 cooperating with a suitable light guide 103 are positioned. A light beam 104 emanating from the light guide 103 is used to illuminate a front surface of the flexible display 105.

While specific embodiments of the invention have been described above, it will be appreciated that the invention may be practiced otherwise than as described. In addition, isolated features discussed with reference to different figures may be combined.

The invention claimed is:
1. An electronic apparatus comprising:
 a housing;
 a functional module; and
 a flexible display cooperating with the housing and arranged to be alternated between an at least partially collapsed state and an at least partially extended state;
 wherein said housing comprises a plurality of substantially rigid portions arranged to at least partially support sides and/or a back of the flexible display in the at least partially extended state,
 said rigid portions are arranged for at least partially receiving said functional module,
 said functional module comprises a touch-sensor arranged on said rigid portions within a normal projection area of an active area of the flexible display,
 said touch sensor comprises a plurality of touch sensor segments corresponding respectively to said rigid portions, and
 said rigid portions comprise means for displacing the respective touch sensor segments during a transition between the collapsed state and the extended state.

2. The electronic apparatus according to claim 1, wherein the rigid portions are arranged as U-shaped telescopic parts.

3. The electronic apparatus according to claim 1, wherein the rigid portions are arranged for receiving all or a part of the flexible display, and the touch sensor cooperates with the edge portion of the flexible display.

4. The electronic apparatus according to claim 1, wherein said means for displacing are selectable from the group consisting of: chamfered edges, cams, bars and springs.

5. The electronic apparatus according to claim 1, wherein the touch sensors are displaceable for enabling their mutual alignment for forming a substantially flush surface.

6. The electronic apparatus according to claim 1, wherein the touch sensor segments are selected from the group consisting of: capacitive sensors, pressure sensors, electromagnetic sensors, acoustic sensors and resistive sensors.

7. The electronic apparatus according to claim 6, wherein the touch sensor segments comprise a set of inductive coils arranged below the flexible display conceived to cooperate with a magnetizable body conceived to be positioned above the flexible display in use.

8. The electronic apparatus according to claim 7, wherein the magnetizable body comprises a pressure sensitive element arranged on a surface of said body conceived to cooperate with a surface of the flexible display.

\* \* \* \* \*